United States Patent [19]
Horn et al.

[11] 3,974,034
[45] Aug. 10, 1976

[54] MALTO-DEXTRINS OF IMPROVED STABILITY PREPARED BY ENZYMATIC HYDROLYSIS OF OXIDIZED STARCH

[75] Inventors: Harold E. Horn, Oak Lawn; Bruce A. Kimball, Chicago, both of Ill.

[73] Assignee: CPC International Inc., Englewood Cliffs, N.J.

[22] Filed: Sept. 12, 1975

[21] Appl. No.: 612,989

[52] U.S. Cl. .............................. 195/31 R; 195/30; 426/48; 426/658; 426/661
[51] Int. Cl.² .................................... C12D 13/02
[58] Field of Search ................. 195/31 R, 11, 7, 30; 260/233.3 R; 127/29, 70; 426/48, 661, 658

[56] References Cited
UNITED STATES PATENTS

| | | | |
|---|---|---|---|
| 2,916,405 | 12/1959 | Evans et al. | 426/661 |
| 3,354,046 | 11/1967 | MacAllister | 195/7 |
| 3,539,366 | 11/1970 | Ewing | 260/233.3 R X |
| 3,616,219 | 10/1971 | Massey | 195/31 R |
| 3,634,395 | 1/1972 | Walon | 260/233.3 R |
| 3,663,369 | 5/1972 | Morehouse et al. | 195/31 R |
| 3,709,788 | 1/1973 | Best et al. | 195/31 R |

OTHER PUBLICATIONS

Parrish et al., "Actions of Starch Carbohydrates on Chemically Modified Maltodextrins," *Arch. Biochem. and Biophys.,* vol. 137, pp. 185–189 (1970).

*Primary Examiner*—A. Louis Monacell
*Assistant Examiner*—Thomas G. Wiseman
*Attorney, Agent, or Firm*—Albert P. Halluin

[57] ABSTRACT

There is disclosed malto-dextrins having a D.E. not substantially above about 20, prepared by the enzymatic hydrolysis of oxidized starch. Syrups of the malto-dextrins are capable of remaining haze-free for long periods of time at high solids concentrations. The malto-dextrins are prepared by first liquefying and oxidizing starch at elevated temperatures to provide an oxidized and liquefied starch substantially free of residual starch granules, and in a subsequent step, converting the oxidized and liquefied starch with a bacterial alpha-amylase enzyme preparation to achieve a maltodextrin product having a D.E. not substantially above about 20.

9 Claims, No Drawings

MALTO-DEXTRINS OF IMPROVED STABILITY PREPARED BY ENZYMATIC HYDROLYSIS OF OXIDIZED STARCH

BACKGROUND OF THE INVENTION

1. Field of the Invention

This invention relates to malto-dextrin syrups which remain clear over a relatively long period of time at high solids concentrations. The syrups are particularly useful as extenders for synthetic sweeteners. The invention is also concerned with a method of preparing said syrups wherein the first step includes simultaneous oxidation and liquefaction of the starch at elevated temperatures and conversion with an enzyme.

2. Description of the Prior Art

There are many processes known in the art for producing starch hydrolysates. These processes include liquefying an aqueous slurry of starch with an acid, followed by enzymatic conversion, sometimes referred to as saccharification, or liquefying an aqueous slurry of starch with a liquefying enzyme, followed by enzymatic conversion. For example, Dutch Patent Publication No. 66/12486, published Apr. 3, 1967, discloses a method for hydrolyzing an aqueous slurry of starch with an acid to a D.E. of at least about 7 to no more than about 16, followed by enzymatic conversion with bacterial alpha-amylase to a D.E. in the range of from about 23 to about 35. Products produced by this technique are referred to by the corn wet milling industry as "corn syrup solids" or "glucose solids".

Another known class of starch hydrolysates is referred to by the corn wet milling industry as "malto-dextrins" or "hydrolyzed cereal solids". Malto-dextrins are starch hydrolysates having a measurable dextrose equivalent value not substantially above about 20 and contain a relatively small amount of dextrose and maltose. Generally, the dextrose content of malto-dextrins is less than about 2.4%, by weight and the amount of maltose is less than about 9%, by weight.

Malto-dextrins are commercially available under the tradenames, Mor-Rex, manufactured and sold by Corn Products, a Unit of CPC International Inc., International Plaza, Englewood Cliffs, N.J.; Maltrin, manufactured and sold by Grain Processing Corporation; Frodex, manufactured and sold by American Maize Products Company; and Star-Dri, manufactured and sold by A. E. Staley Manufacturing Company.

Many commercially available malto-dextrins are generally prepared by first liquefying native starch with an acid or an enzyme to a D.E. less than about 15, followed by an enzymatic conversion to the final desired D.E. Products produced by these methods are extremely soluble in water and their concentrated syrups are haze resistant at low temperatures for at least 3 days. One specific method for preparing these unique malto-dextrins is disclosed and claimed in U.S. Pat. No. 3,560,343 and its reissue application Ser. No. 327,335, filed Jan. 29, 1973. This patent and reissue application disclose and claim a process whereby an aqueous slurry of starch is first solubilized with an acid at elevated temperatures to a D.E. less than about 15, followed by enzymatic conversion with a bacterial alpha-amylase enzyme preparation to increase the D.E. by at least 5 to obtain a product having a D.E. of 10 to 25.

U.S. Pat. No. 3,849,194, granted Nov. 19, 1974, discloses and claims a process for preparing waxy starch based malto-dextrins wherein a slurry of waxy starch is liquefied with an enzyme and thereafter converted to the desired D.E. by the action of a bacterial alpha-amylase enzyme preparation. U.S. Pat. No. 3,853,706, granted December 10, 1974, discloses and claims a process for preparing malto-dextrins derived from non-waxy starches by first liquefying and solubilizing non-waxy starch in an aqueous slurry with an enzyme, heating the slurry to a temperature above about 95°. and thereafter converting the heat-treated slurry with a bacterial alpha-amylase enzyme preparation to obtain the desired product. German Patent Publication No. 1,955,392, published June 16, 1971 and British Patent Specification No. 1,274,506, which generally correspond to U.S. Pat. No. 3,663,369 also disclose a process for preparing malto-dextrins, wherein an aqueous slurry of starch is liquefied with an acid or enzyme to a D.E. not substantially above about 3, followed by enzymatic conversion with a bacterial alpha-amylase enzyme preparation to obtain a malto-dextrin having a D.E. not substantially above about 18.

The aforementioned prior art methods provide malto-dextrin products which perform well in many applications, particularly when used as a carrier for synthetic sweeteners. Other applications for the malto-dextrins include use as a bulking or dispersing agent in synthetic creams or coffee whiteners, as a moisture-holding agent in breads, pastries, meats and as a bodying and smoothing agent in puddings, soups, and frozen ice desserts.

The malto-dextrins of the aforementioned prior art methods are first prepared in syrup form and generally dried to a solid. However, many users of malto-dextrins desire a liquid product to reduce handling costs and to eliminate the need for redispersing a dried product. It has been found that one cannot store and/or ship malto-dextrins of the desired low D.E. in highly concentrated form. To date, there is no known economical method for preparing a malto-dextrin syrup at high solids which is resistant to the formation of haze on storage. The malto-dextrins prepared by the aforementioned prior art methods tend to haze when their syrups are in concentrated form, due to the reassociation of the partially degraded starch molecules in the solution. For example, malto-dextrins from corn starch having a D.E. less than about 20 when concentrated up to about 70% solids tend to quickly haze upon storage, until the point where the product sets up to a solid. Attempts to produce a waxy malto-dextrin product at about a 70% solids content or above and having a D.E. less than about 15, results in hazing when the syrup is stored for long periods of time, i.e., more than about three days.

It has been disclosed in U.S. Pat. Nos. 3,616,219 and 3,709,788, that bleached starches can be treated with bacterial alpha-amylase enzyme preparations. These products are useful as adhesives and coatings in the manufacture of paper and textile products.

Bleached starches are starches produced by an oxidative treatment which leads to a marked whitening of the starch. Generally, the severity of the oxidative treatment is controlled so that the carotene, xanthophyll and related pigments naturally occurring in the starch are efficiently oxidized to colorless compounds while the starch product is only slightly oxidized (D.S. ≦ 0.1 as later defined) if at all. Bleaching may be carried out either in a dry state or in solution and a wide variety of oxidizing agents may be employed; the only restrictive requirement being that the oxidizer chosen must be mild enough under the chosen reaction conditions so that the starch will not be excessively attacked and the oxidizer must be strong enough so that the pigments will be effectively oxidized. Examples of usable bleaching agents include, but are not limited to, chlorine, bromine, hypochlorite, permanganate, ozone, chlorites and chlorites in combination with persulfates. Methods of bleaching starch are discussed in more detail in "Chemistry and Industry of Starch", second edition, R. W. Kerr, editor, Academic Press, Inc., New York, N.Y. (1950).

Oxidized starches are starches produced from the oxidative treatment of the starch which leads to chemical changes in the starch. For example, oxidation of primary alcohol groups to carboxyl groups, of aldehyde groups to carboxyl groups, of secondary alcohol groups to ketone groups, and of glycol groups to carboxyl groups. The oxidation of starch leads to a starch product which is more easily solubilized and which exhibits a lower viscosity when solubilized in water. Oxidation may be carried out by utilizing any of a number of oxidizing agents. Often the oxidizing agents used to form oxidized starch are the same agents that are used to bleach starch. Harsher reaction conditions such as higher temperatures, longer contact times, different pH, etc., are used to cause these agents to react with the starch molecules rather than just the carotene, etc. Reagents used in the oxidation of starch include, but are not limited to air, bleaching powder, halogens, chloramines, chloric acid, chlorates, chromic acid, ferric-chloride, hydrogen peroxide, hypochlorite, manganese dioxide, nitric acid, nitrogen dioxide, perborates, periodic acid, persulfates, potassium dioxide, potassium permanganate, silver oxide, p-toluene sulfochloramide and zinc oxide. Methods of oxidizing starch are also disclosed in more detail in the previously cited text, "Chemistry and Industry of Starch".

The repeating anhydroglucose units in starch may have different degrees of substitution (D.S.), i.e., from one to three, and starch derivatives are generally categorized in terms of their D.S. In a given quantity of a starch derivative, there will generally be some anhydroglucose units that are not substituted at all (i.e., D.S.,O), together with other anhydroglucose units that have different degrees of substitution, from 1 to 3. A statistical average is employed to characterize the average D.S. of the entire quantity, although the figure is ordinarily stated as the D.S. rather than the average D.S. The oxidized starch treated according to this invention may have a varying range of D.S. (carboxyl substitution) which may be as little as 0.0001, up to the maximum level of 3.0. Irrespective of the number of molecules of starch which are reacted, or the actual sequence of substitution, or the number of anhydroglucose units involved, the general formula is intended to represent products where the substitution may occur to various degrees of substitution at all or less than all anhydroglucose units in all or less than all starch molecules.

The distinction between oxidized and bleached starches is now well known to those skilled in the art, particularly the corn wet milling industry. Such a distinction is described in U.S. Pat. No. 3,598,622, the disclosure of which is incorporated herein by reference.

In view of the difficulty incurred by the prior art in producing haze-free starch hydrolysates from untreated starch and the inability to provide haze-free, malto-dextrins from bleached starches, the art has not attempted to produce malto-dextrins from oxidized starch.

OBJECTS OF THE INVENTION

It is accordingly an object of the present invention to provide a process for the enzymatic hydrolysis of oxidized and liquefied starches to haze-free malto-dextrin products.

It is a more specific object of the present invention to provide a process for the conversion of oxidized staches to malto-dextrin products which can be concentrated to high solid content syrups which are resistant to haze formation.

SUMMARY OF THE INVENTION

The present invention provides malto-dextrins having a D.E. not substantially above 20 and preferably within the range of about 8–20, prepared by the enzymatic conversion of simultaneously oxidized and liquefied starch. The malto-dextrins of the present invention are further characterized by having a relatively narrow distribution of their polysaccharides.

The malto-dextrins of the present invention can be refined to produce syrups which remain haze-free for long periods of time, even at high solids concentrations of the order of 70–80%, d.b. They are capable of being dissolved in water to a solids content as high as 80% by weight to obtain syrups which exhibit remarkable solution stability, and remain haze-free, as compared to prior art low D.E. starch hydrolysate syrups. Syrups produced from the malto-dextrins of the present invention may be stored and shipped in highly concentrated form without risk of haze formation or without the risk of syrup setting up to a solid or semi-solid state.

Syrups from malto-dextrins of the present invention can have solids contents ranging from 50–80% or higher, and most frequently 50–75% by weight. Such concentrated syrups may, if desired, be spray dried and later reconstituted to a highly concentrated syrup which is resistant to haze formation since the malto-dextrins of the present invention, in dry form, are totally water soluble.

Malto-dextrins of the present invention are prepared by first simultaneously liquefying and oxidizing starch at elevated temperatures with an oxidizing agent to a measurable dextrose equivalent value (D.E.) not substantially above about 4. In a subsequent step, the liquefied, oxidized starch is subjected to enzymatic conversion with a saccharification enzyme, preferably an alpha-amylase enzyme preparation to produce a malto-dextrin having a D.E. not substantially above 20, and preferably within the range of about 8 to 20.

DESCRIPTION OF THE PREFERRED EMBODIMENT

The malto-dextrins of the present invention exhibit solution stability and remain haze-free over extended periods of time, even at high solids content. They normally have a D.E. not substantially above 20, and preferably a D.E. within the range of 8 to 20. A typical malto-dextrin of the present invention genrally has a D.E. within the range of about 8 to about 14.

The term "measurable dextrose equivalent value" (D.E.) referred to herein, is defined as the reducing value of the malto-dextrin (hydrolysate) material compared to the reducing value of an equal weight of dextrose, expressed as percent, dry basis, as measured by the Schoorl method described in Encyclopedia of Industrial Chemical Analysis, Vol. 11, pp. 41–42, i.e., $$D.E. = \frac{\text{Reducing Value of Hydrolysate Material}}{\text{Reducing Value of Dextrose}} \times 100$$

In the above equation, an equal weight of each of dextrose and the hydrolysate material are involved. The term dextrose equivalent value of a starch hydrolysate is a common expression in the art for describing the total reducing sugars content of a material calculated as dextrose and expressed as percent, dry basis.

The malto-dextrins of the present invention have a relatively narrow saccharide distribution. In general, the amount of the dextrose or monosaccharide is less than 1.4% by weight, the amount of the maltose present is less than 9% by weight and the amount of the maltotriose is less than 11% by weight. The malto-dextrins of the present invention remain haze-free at solids concentrations of about 70%, by weight, dry basis, for periods of more than 60 days when the D.E. is within the range of 8 to 14.

As indicated hereinabove, oxidized starches are used in the preparation of the malto-dextrins of this invention. In the preferred practice of this invention, the oxidized starches are those prepared by high temperature oxidation with a hypochlorite, and preferably an alkali metal or alkaline earth metal hypochlorite. However, other well-known reagents for the oxidation of starches such as those discussed above may be used in the production of oxidized starches.

In carrying out the simultaneous oxidation and liquefaction step, the starch is suspended in water to form a slurry having a dry solids content ranging from 10 to 50%, by weight, and preferably 25 to 45%, by weight. The oxidizing agent is added to the slurry and the pH is adjusted within the range of 5 to 8, and most preferably 6 to 7.5. The suspended starch slurry is then rapidly heated to a temperature of at least about 100°C., and preferably within the range from about 120° to about 175°C. The pH is preferably maintained within the range of 5 to 8 and most preferably 6 to 7.5 during the oxidation and liquefaction step. This high temperature oxidation and liquefaction thoroughly and rapidly depolymerizes and gelatinizes the starch so that the dispersed slurry is substantially free of residual starch granules and there is substantially no increase in the D.E. Thus, a substrate for uniform enzymatic conversion is obtained. By using the rapid, high temperature oxidation step, the acid or enzymatic liquefaction step used in the prior art processes for preparing malto-dextrins can be eliminated. This is a substantial advantage since it saves enzyme and refining costs. Also, the final product has improved properties with respect to filterability and optical clarity.

The resulting oxidized starch generally has a Scott viscosity (100g) within the range of 35 to 70 and a pH of 6 to 9. Such oxidized starches have a minimum carboxyl value of at least about 0.1, and preferably 0.2 to 1.5.

In the use of the preferred halogen-containing oxidizing agents described above, the level of the oxidant in the starch is expressed on the basis of the halogen content of the oxidizing agent. For example, the most preferred oxidizing agent, sodium hypochlorite (e.g., high alkaline (NaCl) is used in an amount expressed as chlorine content of the starch on a dry basis (d.b.).

In the practice of this invention, it has been found that the oxidant level is generally at least about 0.33% and it is preferably at least 1%, calculated as halogen on a dry basis. The use of oxidant levels below 1% can, in some cases, result in high paste viscosities and low filtration rates in the final product. In general, it is preferred to employ an oxidant level within the range of 1 to 15% by weight, and preferably 1 to 8% by weight on a dry basis, with the amount of the oxidizing agent being expressed in terms of its available halogen content.

After the liquefaction step has been substantially completed, the oxidized and liquefied starch is cooled and then treated with a saccharifying or dextrinizing enzyme, preferably to increase the D.E. by at least 2 and more preferably to increase the D.E. by at least about 5, and to produce a final hydrolysate having a D.E. not substantially above 20 and preferably within the range of about 8 to 20.

The enzyme used for enzymatic conversion of the oxidized starch is an alpha-amylase, and preferably an alpha-amylase of the type described below. The pH of the conversion medium is generally maintained for the optimum activity of the bacterial alpha-amylase, which is preferably within the range of a pH between about 5.0 and about 9.0. It has been found, however, that best results are usually obtained when the enzymatic conversion reaction is carried out at a temperature which is at least about 60°C. In general, enzymatic conversion is carried out at a temperature below 85°C. but at least about 60°C.

The enzyme used for enzymatic liquefaction and conversion of the oxidized starch is an alpha-amylase and preferably a bacterial alpha-amylase. Suitable bacterial alpha-amylases can be derived from strains of *Bacillus subtilis*, *Bacillus mesentericus*, *Bacillus coagulans*, *Bacillus amyloliquefaciens*, and *Bacillus licheniformis*. Especially suitable alpha-amylases are those derived from *Bacillus licheniformis* and *Bacillus subtilis*. Particularly preferred are those derived from *Bacillus licheniformis* such as those derived from a strain of *Bacillus licheniformis* organism selected from the group consisting of NCIB 8059, NCIB 8061, ATCC 6598, ATCC 6634, ATCC 8480, ATCC 9545A, and ATCC 11945. The preparation of enzymes from *Bacillus licheniformis* organisms is described in Austrian Patent Publication No. 4836/70, German Patent Publication No. 2,025,748, and British Patent Specification No. 1,296,839, the disclosure of which is incorporated herein by reference. These alpha-amylase enzyme preparations are commercially available under the tradename "Thermamyl", "Thermamyl 60" and "Thermamyl 120" from Novo Terapeutisk Laboratorium, Copenhagen, Denmark.

Other commercially available alpha-amylases which may be used in the practice of the present invention include "Takamine HT-1000" and "Tenase" (available from Miles Laboratories, Inc.), "Dex-Lo MM" and "CPR-8" (available from Wallerstein Division of Baxter Laboratories), "Kleinstase GM-16" and "Kleinstase L-1" (available from Daiwa Kasai), and "Rapidase SP-250" (available from Societe "Rapidase", France).

The amount of alpha-amylase to be used in the liquefaction and conversion steps of the process will generally be in the range from about 0.1 to about 25 units per gram of starch (dry basis).

The alpha-amylase activity of an enzyme is determined as follows:

The enzyme is allowed to react with a standard starch solution under controlled conditions. Enzyme activity is determined by the extent of starch hydrolysis, as reflected by a decrease in iodine-staining capacity, which is measured spectrophotometically. The unit of bacterial alpha-amylase activity is the amount of enzyme required to hydrolyze 10 mg. of starch per minute under the conditions of the procedure. The method is applicable to bacterial alpha-amylases, including industrial preparations, except materials which possess significant saccharifying activity.

From 0.3 to 0.5 gram of solid sample or from 0.3 to 1.0 ml. of a liquid sample is dissolved in a sufficient quantity of 0.0025 M. aqueous calcium chloride to give an enzyme solution containing approximately 0.25 unit of activity per ml.

A mixture of 10 ml. of 1% Lintner starch solution, equilibrated to 60°C and 1 ml. of the enzyme sample to be tested is mixed and held in a constant temperature bath at 60°C for exactly 10 minutes. A 1-ml. sample is removed and added to a mixture of 1 ml. of 1 M aqueous hydrochloric acid and about 50 ml. of distilled water. The iodine-staining capacity of such acidified sample then is determined by adding 3.0 ml. of 0.05% aqueous iodine solution, diluting to 100 ml. with distilled water, and mixing well. The absorbance of the solution, relative to that of distilled water, is measured at 620 nm, in a 2-cm cell.

A similar measurement is made of the standard starch solution (to which water is added instead of the enzyme solution) to provide a blank absorbance.

The enzyme activity, in units/gram or/ml. is equal to $$\frac{(\text{Blank Absorbance - Sample Absorbance}) \times \text{Dilution Factor} \times 50}{\text{Blank Absorbance} \times 10 \times 10}$$

The amount of bacterial alpha-amylase to be used ranges from about 0.1 to about 25 units per gram of starch (dry basis). The use of larger amounts provides no practical advantage; the increased starch solubilization which results from the use of more than 25 units per gram does not justify the additional cost of enzyme. The optimum quantity of alpha-amylase depends upon the quantity of saccharifying enzyme, and vice versa. A preferred range of concentration of alpha-amylase is from about 1.0 to about 10 units per gram of starch (dry basis).

After the second step, enzymatic conversion can be stopped by adjusting the pH of the hydrolyzed, oxidized starch to a pH of 4.5 or below, or, alternatively, by heating the conversion mixture to a temperature above the inactivation temperature of the enzyme. After termination of the enzymatic conversion, the starch hydrolysate has a solids content of less than 50%. It may be used in an unaltered or refined form as desired. It is sometimes preferred to concentrate the starch hydrolysate to form a syrup having a solids content greater than 50% as described above. Such refining operations are, however, conventional and include treatment with vegetable carbon, ion exchange resins, filtration, centrifugation and the like, as desired, to place the hydrolysate in the desired form for shipment and/or storage or use.

The process of the present invention is applicable to a wide variety of starchy materials, including cereal starches, waxy starches and/or root starches. Typical of such starches are the non-waxy cereal starches, such as corn starch and wheat starch; potato starch, tapioca starch; grain sorghum starch; rice starch, etc.; waxy starches such as waxy milo starch and waxy maize starch and the like. The invention is also applicable to corn grits and other raw materials high in starch content.

One of the significant improvements of the present invention which utilizes a simultaneous oxidation and liquefaction is the marked increase in filtration rates of the final product. For example filtration rates of a white milo malto-dextrin prepared from low temperature oxidation followed by acid or enzyme liquefaction and enzyme conversion were 0.5 –1 gallon/hr/ft2 and for waxy corn malto-dextrin 3.5 gallon/hr/ft2. The filtration rates of high temperature oxidized waxy corn starch substrates increases with increasing temperature and level of oxidant. The effect of the oxidant on filtration (e.g. chlorine from NaOCl2) on the filtration rate reaches a maximum at about 2 percent while the temperature still has a marked effect at temperatures above about 125°C. The filtration rates for high temperature oxidation of waxy corn substrates are from 2 to 5 times higher than low temperature oxidized starch substrate derived malto-dextrins depending on the temperature and oxidant level being used. It is believed that the improved filtration rates are due to the shorter polymer chain lengths and subsequently less refinery sludge on the filter.

In a preferred mode of operating the process of this invention includes the use of a starch prewash step prior to the simultaneous oxidation and liquefaction step. This prewash step can be accomplished by treating the starch slurry with alkaline NaOCl2 in an amount to provide 0.5% Cl2, dry basis. The prewashing step solubilizes and removes organic materials which are the source of odoriferous compounds formed during high temperature oxidation and liquefication which are carried through to the finished product.

The present invention having been described in detail, the following specific examples are provided to illustrate additional embodiments of the process and product thereof. It is to be understood that the examples are given for illustrative purposes only and not by way of limitation.

EXAMPLE 1

In the preparation of several malto-dextrin products, a semicontinuous process of performing the process of the present invention is employed utilizing the following sequential steps.

1. A slurry of starch is prepared to a dry substance of 35.5% to 39.1% (20°–22° Baume) at 15.5°C (60°F.).
2. Sodium hypochlorite (NaOCl2) is added to the starch slurry in an amount to provide 0.5%, d.b., based on starch dry substance and the slurry is agitated for 1 hour at 37.7°C (100°F) to 43.3°C (110°F).
3. NaHSO3 is added after 1 hour as antichlor according to procedures known in the art.
4. The slurry is filtered.
5. The slurry is diluted to 17.8% to 26.7% dry substance (10°–15° Baume) at 15.5°C (60°F)
6. Sodium hypochlorite is added to the starch slurry in an amount to provide 0.3 – 0.5% available chlorine, based on slurry dry substance.

7. The starch slurry is continuously and rapidly heated to a temperature in the range from 126.6°C (260°F) to 148.8°C (300°F) using a tangential or tubular type cooker to thoroughly oxidize and gelatinize the starch to provide a liquefied, oxidized substantially free of residual starch granules. The pH is maintained within the range from 6 to 7.5.
8. The oxidized and liquefied slurry is then dosed with NaHSO3 as antichlor and then cooled to 76.6°C (170°F) and the pH is adjusted to 6.5 to 7.0, if needed.
9. The oxidized and liquefied starch slurry is then dosed with 0.03% (d.b.) of bacterial alpha-amylase (HT-1000 from Miles Laboratories, Inc.), the amount being based upon dry substance. The enzymatic conversion is conducted until the D.E. is within the range of 8 to 20, preferably 10 to 15. This conversion generally takes about 3 to 4 hours at the 0.03% HT-1000 dosage of the enzyme.
10. The enzymatic reaction is terminated by adjusting the pH to 4.0 with hydrochloric acid.
11. The malto-dextrin is then refined by filtering, carbon treatment (1–2% Darco 5–51 or equivalent based on % dry substance at 76.6°C (170°F) for about 15 minutes, re-filtering and treatment with cation and anion exchange resins.
12. The pH of the refined syrup is adjusted to 4.8 to 5.2, and 0.004% NaHSO3 based on dry substance is added.
13. The clear malto-dextrin syrup is vacuum evaporated to 71–73% dry substance and analyzed for product characteristics.

The results of the process described above on several starches are shown in the following table.

TABLE 1

| Substrate: | White Milo | White Milo | White Milo | White Milo | Waxy Corn | Corn |
|---|---|---|---|---|---|---|
| % Oxidant as Chlorine (d.b.) | 1.0 | 3.25 | 5.50 | 5.50 | 5.50 | 5.50 |
| % Dry Substance of syrup | 72.7 | 71.6 | 72.8 | 72.3 | 73.2 | 72.2 |
| Dextrose Equivalent | 16.7 | 9.5 | 18.4 | 13.4 | 13.8 | 13.7 |
| Color (X100) (40°Be') | 1.9 | 2.1 | 2.3 | 2.2 | 2.5 | 2.9 |
| Filtration rate (160°F) gals/(hr/ft$^2$) | 0.9 | 0.5 | 0.9 | 0.6 | 3.8 | <0.1 |
| Chromatographic Analysis (Carbohydrate Basis) | | | | | | |
| DP1 | 0.7 | 0.1 | 1.1 | 0.6 | 0.1 | 0.3 |
| DP2 | 7.3 | 1.7 | 8.9 | 6.5 | 3.3 | 6.0 |
| DP3 | 9.4 | 2.8 | 9.6 | 10.6 | 4.6 | 10.5 |
| DP4 | 6.2 | 2.2 | 5.4 | 8.0 | 3.0 | 7.9 |
| DP5 | 8.1 | 1.7 | 7.2 | 9.3 | 1.8 | 7.8 |
| DP6 | 5.1 | 0.4 | 5.8 | 6.1 | 1.0 | 6.2 |
| DP7 | 63.2 | 91.1 | 62.0 | 58.9 | 86.2 | 61.3 |
| Viscosity (cps) 75°F | 45,000 | +200,000 | 36,000 | 114,000 | 182,000 | — |
| Time To Haze (Days)* | | | | | | |
| 40°F | >75 | >75 | >75 | >75 | >75 | >75 |
| 75°F | >75 | >75 | >75 | >75 | >75 | >75 |

*At times indicated, samples showed mold growth and were discarded.

The above data show that the malto-dextrins thus produced from the simultaneously oxidized and liquefied starches remain haze free for longer than 75 days at a solids content of at least about 70%, dry basis.

EXAMPLE 2

Using the same 13 step procedure described in Example 1, waxy corn starch is simultaneously oxidized and liquefied with varying amounts of sodium hypochlorite, followed by enzymatic conversion as described in Example 1. The temperatures employed in the oxidation step were either about 127°C (260°F) or about 149°C (300°F).

The results of these Experiments are shown in the following table

TABLE 2

| Substrate | Waxy Corn | Waxy Corn | Waxy Corn | Waxy Corn | Waxy Corn |
|---|---|---|---|---|---|
| Temperature of oxidation, °C | 127 | 149 | 127 | 149 | 149 |
| % Oxidant as Chlorine (d.b.) | 0.5 | 0.5 | 1.0 | 1.0 | 0.33 |
| % Dry Substance of Conc. Syrup | 71.1 | 72.5 | 70.0 | 71.2 | 71.5 |

TABLE 2-continued

| Substrate | Waxy Corn | Waxy Corn | Waxy Corn | Waxy Corn | Waxy Corn |
|---|---|---|---|---|---|
| Dextrose Equivalent | 12.4 | 13.8 | 11.2 | 12.7 | 11.5 |
| Color (X100) (40°Be') | 2.4 | 2.3 | 2.2 | 2.6 | 2.5 |
| Chromatographic Analysis (Carbohydrate Basis) | | | | | |
| DP1 | 0.4 | 0.4 | 0.3 | 0.5 | 0.3 |
| DP2 | 2.8 | 3.5 | 1.9 | 2.5 | 2.4 |
| DP3 | 4.1 | 5.6 | 3.0 | 4.3 | 4.3 |
| DP4 | 3.2 | 3.8 | 2.3 | 3.2 | 2.8 |
| DP5 | 2.9 | 2.3 | 1.5 | 1.4 | 1.2 |
| DP6+ | 84.4 | 94.4 | 91.0 | 88.1 | 89.0 |
| Time to Haze (Days) | | | | | |
| 40°F | >60 | >60 | >60 | >60 | >60 |
| 75°F | >60 | >60 | >60 | >60 | >60 |

As the data reveals, the malto-dextrins thus produced remained haze free more than 60 days even though the syrups had solids content of 70%, d.b., or greater.

EXAMPLE 3

Using the 13 step procedure described in Example 1, white milo starch and waxy corn starch are simultaneously oxidized and liquefied with sodium hypochlorite and then subjected to enzymatic conversion to a D.E. of about 11. The liquefaction and conversion steps are carried out using the same procedure as described in Example 1.

The results of these experiments are shown in the following table.

TABLE 3

| Substrate | White Milo | Waxy Corn |
|---|---|---|
| Oxidation temperature, °C | 149 (300°F) | 149 (300°F) |
| % Oxidant is Chlorine (d.b.) | 0.33 | 0.33 |
| % Dry Substance of Conc. Syrup | 71.6 | 73.0 |
| Dextrose Equivalent | 11.2 | 11.1 |
| pH | 5.1 | 5.1 |
| Viscosity cps (25°C) | 104,000 | +200,000 |
| Filtration Rate (74°C) gal. (hr/ft$^2$) | 2.5 | 7.0 |
| Product Treatment Color (40°Be') | | |
| After primary filtration | 5.8 | 4.9 |
| After 1% carbon treatment | 2.5 | 3.6 |
| After ion-exchange | 0.5 | 1.5 |
| Finished product | 0.7 | 1.7 |
| Chromatographic Analysis (carbohydrate basis) | | |
| DP1 | 0.5 | 0.4 |
| DP2 | 3.4 | 2.0 |
| DP3 | 5.8 | 3.2 |
| DP4 | 4.6 | 1.9 |
| DP5 | 7.8 | 1.3 |
| DP6 | 10.1 | 91.2 |
| DP7+ | 67.8 | — |

EXAMPLE 4

In this example waxy corn derived malto-dextrins are prepared according to the 13 step procedure of Example 1, using different temperatures to ascertain the effect of temperature during the simultaneous oxidation and liquefaction on the filtration rates of the final syrup. This study also includes varying the concentration of the oxidant. The conditions and results are described in the following table.

TABLE 4

Effect of Thermal-Oxidation on Filtration Rates Of Enzyme Converted Starch Pastes Substrate: Waxy Corn

| | Filtration Rates (gal/hr/ft$^2$) % Chlorine (d.b.) | | | | |
|---|---|---|---|---|---|
| Temperature, °C | 0.1 | 0.33 | 0.50 | 1.0 | 2.0 |
| 127 (260°F) | 3.9 | 8.6 | 9.2 | 11.0 | 11.1 |
| 149 (300°F) | 4.3 | 13.5 | 15.0 | 16.2 | 17.1 |

As it can be seen from the above data, the higher temperature during simultaneous oxidation and liquefaction step, the better filtration rates of the final syrup. Thus, a significant economical advantage is obtained by employing high temperatures during the simultaneous oxidation and liquefaction step of the process.

EXAMPLE 5

In this example, the paste viscosities of oxidized and liquefied starch at various temperatures and oxidant dosages are determined. The conditions and results are set forth in the following table.

TABLE 5

Effect of Temperature and Chlorine Concentration On Thermal-Oxidation Starch Paste Viscosities Substrate: Waxy Corn

| | Initial Brookfield Viscosity (cps) Temp.=98.8°C (210°F) % Chlorine (d.b.) | | | | |
|---|---|---|---|---|---|
| Temperature, °C | 0.1 | 0.33 | 0.50 | 1.0 | 2.0 |
| 115.5 (240°F) | 944 | 628 | 702 | 156 | 58 |
| 126.6 (260°F) | 952 | 314 | 466 | 134 | 30 |
| 137.7 (280°F) | 1176 | 200 | 270 | 106 | 24 |
| 148.8 (300°F) | 1054 | 196 | 192 | 54 | 22 |
| 160 (320°F) | 1658 | 282 | 174 | 56 | 18 |
| Temperature = 73.8°C (165°F) | | | | | |
| 115.5 (240°F) | 1426 | 772 | 678 | 150 | 78 |
| 126.6 (260°F) | 1368 | 448 | 474 | 156 | 40 |
| 137.7 (280°F) | 1604 | 396 | 412 | 132 | 33 |
| 148.8 (300°F) | 1298 | 300 | 272 | 70 | 24 |
| 160 (320°F) | 3210 | 496 | 240 | 64 | 21 |

It can be seen from the above data that the temperature used to oxidize and liquefy the starch has a substantial effect on the starch paste viscosity. As previously stated, the action of a strong oxidizing agent (e.g., NaOCl is one mainly of depolymerization with the action being most active at pH 7. By running the oxidation reactions at elevated temperatures 100° to 175°C, the action proceeds much more thoroughly and rapidly than at room temperature or 38°C. Because the oxidation and liquefaction of the starch is much more rapid at 149°C (300°F) than at 38°C, a starch paste that is essentially lower in average molecular weight is obtained at 149°C.

The effect of liquefaction temperature and dosage of oxidant (e.g. chlorine) is critical only in so far as a balance is achieved between cooked paste viscosity and final product viscosity. Generally speaking, starch paste viscosity is inversly related to the oxidation and liquefaction temperature above a minimum dosage level of 0.33% chlorine (d.b.) The level of 0.33% is determined by observing the amount of residual chlorine remaining after the high temperature oxidation and liquefaction to achieve low paste viscosities and have a slight excess coming out of the heater.

The final product viscosity and carbohydrate distribution are directly related to the cooked paste viscosity, i.e., the higher the initial cooked paste viscosity, the greater the percentage of high molecular weight material present in the finished product which will contribute to haze formation.

The higher dosage of the oxidizing agent (e.g. 1–2% chlorine, d.b.) result in a filtrate from the converted paste which is essentially water-white in color. At lower dosage levels the filtrates are slightly straw-yellow in color. The color bodies which are formed during the high temperature oxidation are more easily removed by ion-exchanging than with carbon refining.

The hydrolysate products of this invention may, as indicated, be concentrated to produce syrups or syrup solids by reducing the moisture content of the syrup to less than 20%, and preferably to less than about 10%. The syrup solids exhibit water solubility and are substantially haze free when placed in solution.

Hydrolysates of the present invention, whether in the form of dilute or concentrated syrups, or in the form of dry solids, are characterized by blandness of taste and low sweetness. They are hygroscopic, and fully soluble in water. When used in food products, they have a minimal effect upon flavor while providing bulk, stability, and lack of hygroscopicity.

The products are thus suitable for use as carriers for synthetic sweeteners, flavorers, coloring agents and essenses; spray drying adjuncts for coffee and tea extracts; bulking, bodying and dispersing agents in synthetic creams or coffee whiteners; ingredients promoting moisture retention in bread, pastry and meats; and, as components of dry soup mixes, bakery mixes, frosting mixes, spice mixes and blends, beverage powders, gravy mixes, sauce mixes and frozen dairy foods. They can also be used in the formulation of anticaking agents, tableting compounds, whipped products, protective coating agglomeration aids and the like.

While the invention has been described in connection with specific embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains and as may be applied to the essential features hereinbefore set forth, and as follows within the scope of the invention.

We claim:

1. A process for the preparation of an oxidized malto-dextrin, comprising treating in a first step an aqueous slurry of starch with an oxidizing agent at a temperature of at least about 100°C to simultaneously oxidize and liquefy the starch to provide a oxidized and liquefied starch having a D.S. (carboxyl value) within the range of from about 0.2 to about 1.5 said slurry being substantially free to residual starch granules, and thereafter, in an enzymatic conversion step, treating the oxidized and liquefied starch with an alpha-amylase enzyme preparation to produce an oxidized starch hydrolysate having a D.E. not substantially above about 20.

2. A process as defined in claim 1 wherein the starch slurry is pretreated with an oxidizing agent prior to the simultaneous oxidation and liquefaction.

3. A process as defined in claim 1 wherein the simultaneous oxidation and liquefaction is conducted at a temperature in the range from about 120° to about 175°C.

4. A process as defined in claim 1 wherein said oxidizing agent is sodium hypochlorite.

5. A process as defined in claim 1 wherein the pH during the oxidation and liquefaction step is in the range from about 5 to 8.

6. A process as defined in claim 1 wherein the temperature of the enzymatic conversion step is in the range from about 60° to about 85°C. and the pH is in the range from about 5 to about 9.

7. A process as defined in claim 1 wherein the starch is a waxy starch.

8. A process as defined in claim 1 wherein the starch is a nonwaxy starch.

9. A process as defined in claim 1 which includes the step of concentrating the oxidized malto-dextrin produced to form a haze-free syrup having a solids content greater than 70%, by weight, dry basis.

* * * * *